US009717177B2

(12) United States Patent
Bian et al.

(10) Patent No.: US 9,717,177 B2
(45) Date of Patent: Aug. 1, 2017

(54) SWITCH CONTROL MECHANISM FOR GARDEN TOOL

(71) Applicant: SUZHOU CLEVA ELECTRIC APPLIANCE CO., LTD., Suzhou (CN)

(72) Inventors: Xiaoxian Bian, Suzhou (CN); Juan Wei, Suzhou (CN); Juan Gu, Suzhou (CN); Yongping Sun, Suzhou (CN)

(73) Assignee: SUZHOU CLEVA ELECTRIC APPLIANCE CO., LTD., Suzhou (CN)

( * ) Notice: Subject to any disclaimer, the term of this patent is extended or adjusted under 35 U.S.C. 154(b) by 34 days.

(21) Appl. No.: 14/804,694

(22) Filed: Jul. 21, 2015

(65) Prior Publication Data

US 2016/0000007 A1 Jan. 7, 2016

Related U.S. Application Data

(63) Continuation of application No. PCT/CN2014/070905, filed on Jan. 20, 2014.

(30) Foreign Application Priority Data

Jan. 25, 2013 (CN) .......................... 2013 1 0028825

(51) Int. Cl.
 *A01D 34/82* (2006.01)
 *A01D 101/00* (2006.01)

(52) U.S. Cl.
 CPC ........ *A01D 34/824* (2013.01); *A01D 2101/00* (2013.01)

(58) Field of Classification Search
 CPC .............. A01D 34/6812; A01D 34/824; A01D 34/6804; A01D 34/84
 See application file for complete search history.

(56) References Cited

U.S. PATENT DOCUMENTS

| | | | | |
|---|---|---|---|---|
| 2,689,620 A | * | 9/1954 | Hainke | A01D 34/6806 180/19.1 |
| 3,852,944 A | * | 12/1974 | Zuercher | A01D 34/84 172/14 |
| 4,033,098 A | * | 7/1977 | Green | A01D 34/416 172/258 |
| 4,326,368 A | * | 4/1982 | Hoff | A01D 34/6812 192/17 R |
| 5,826,667 A | * | 10/1998 | Notaras | A01G 3/062 172/15 |
| 7,237,620 B2 | * | 7/2007 | Abenroth | A01B 33/028 172/15 |
| 8,312,946 B2 | * | 11/2012 | Lahey | A01D 34/824 180/19.1 |

(Continued)

*Primary Examiner* — Hau Phan
(74) *Attorney, Agent, or Firm* — Perkins Coie LLP (57) ABSTRACT

Disclosed is a switch control mechanism for a garden tool, the mechanism comprising handles, a switch and shift rods. Triggers are arranged on the handles, and the handles can rotate around the axes thereof. The triggers are connected to the shift rods by pull ropes, and the contact faces between the pull ropes and the triggers are spherical faces. The handles of the switch control mechanism for the garden tool can rotate within 360 degrees, so as to satisfy different operators, and can ensure that a user can control the switch of a machine wherever the handles are placed.

12 Claims, 13 Drawing Sheets

(56) References Cited

U.S. PATENT DOCUMENTS

| | | | |
|---|---|---|---|
| 8,991,514 B2* | 3/2015 | Tozawa | A01B 33/028 172/42 |
| 2013/0046448 A1* | 2/2013 | Fan | A01D 34/68 701/50 |
| 2013/0175105 A1* | 7/2013 | Gallazzini | B62D 11/006 180/170 |

* cited by examiner

SWITCH CONTROL MECHANISM FOR GARDEN TOOL

CROSS REFERENCE TO RELATED APPLICATIONS

This application is a continuation of PCT/CN2014/070905 filed 20 Jan. 2014, which claims priority to CN201310028825.X filed 25 Jan. 2013, both of which are incorporated herein by reference.

TECHNICAL FIELD

The present invention relates to a switch control mechanism for a garden tool, in particular to a switch control mechanism for a lawn mower.

BACKGROUND ART

With the development in garden industry, garden tools such as lawn mowers, grass raking machines and scarifiers are more and more widely used. The garden tools generally comprise a machine body and an operating control mechanism, wherein the machine body is used for working on a garden or a landscape, and the operating control mechanism is used for activating and driving the machine.

The position of the operating control mechanism in the prior art is generally fixed, which fails to satisfy different demands of different users with different operation habits and different heights; moreover, in long-term use, such a stationary operating control mechanism is likely to cause working fatigue of the user; therefore, the design is less humanized. Therefore, there exists a need for a garden tool in which the position of a machine operating handle is changeable and meanwhile after the position of the handle is changed, the switch of the machine can still be controlled by a user.

CONTENTS OF THE INVENTION

An object of the present invention is to overcome the weaknesses in the prior art by providing an improved switch control mechanism for a garden tool, which ensures that the machine can be switched on or off with an operating handle of the garden tool being at any position.

In order to achieve the object, the present invention adopts a primary technical solution as follows: a switch control mechanism for a garden tool, comprising handles, a switch and driving levers, wherein the handles are each provided with a trigger and rotatable around a rotational axis thereof, the triggers are connected to the driving levers via pull rope, and contact surfaces between the pull ropes and the triggers are spherical surfaces.

Preferably, each of the triggers is provided with a second clamping groove, each of the pull ropes is provided with a cooperative part, and the contact surface is a contact portion between the cooperative part and the second clamping groove.

Preferably, the cooperative part is spherical.

Preferably, each trigger is provided with a first clamping groove, two ends of each pull rope are respectively provided with the cooperative part, and the cooperative parts are respectively arranged in the first clamping groove and the second clamping groove.

Preferably, the driving levers are rotatable around rotational axes thereof, and the pull ropes are each sheathed with a spring.

Preferably, the handles and driving levers are paired.

Preferably, the switch mechanism for a garden tool further comprises rollers, the pull ropes passing over the rollers to be connected to the driving levers and the triggers.

Preferably, the center of the spherical surface is arranged on the rotational axis of each of the handles.

Preferably, each of the pull ropes at least partially overlaps the rotational axes.

Preferably, the switch mechanism for a garden tool further comprises a control button, and the control button is arranged on a housing of the switch control mechanism for a garden tool.

Preferably, the control button is provided with a tongue part, and the tongue part protrudes above the switch when the control button is pressed.

Preferably, the driving levers are each provided with a trigger end which is arranged above the tongue part.

Compared with the prior art, the present invention has the advantages that the handles of the garden tool can rotate in a range of 360 degrees, meeting different operating habits; meanwhile, the switch mechanism ensures that the machine can be switched on or off with the handles of the garden tool being at any position.

SPECIFIC EMBODIMENTS

A non-limiting detailed description of technical solutions of the present invention is further provided below in connection with several preferred embodiments and the accompanying drawings.

Embodiment I

Figure 1:
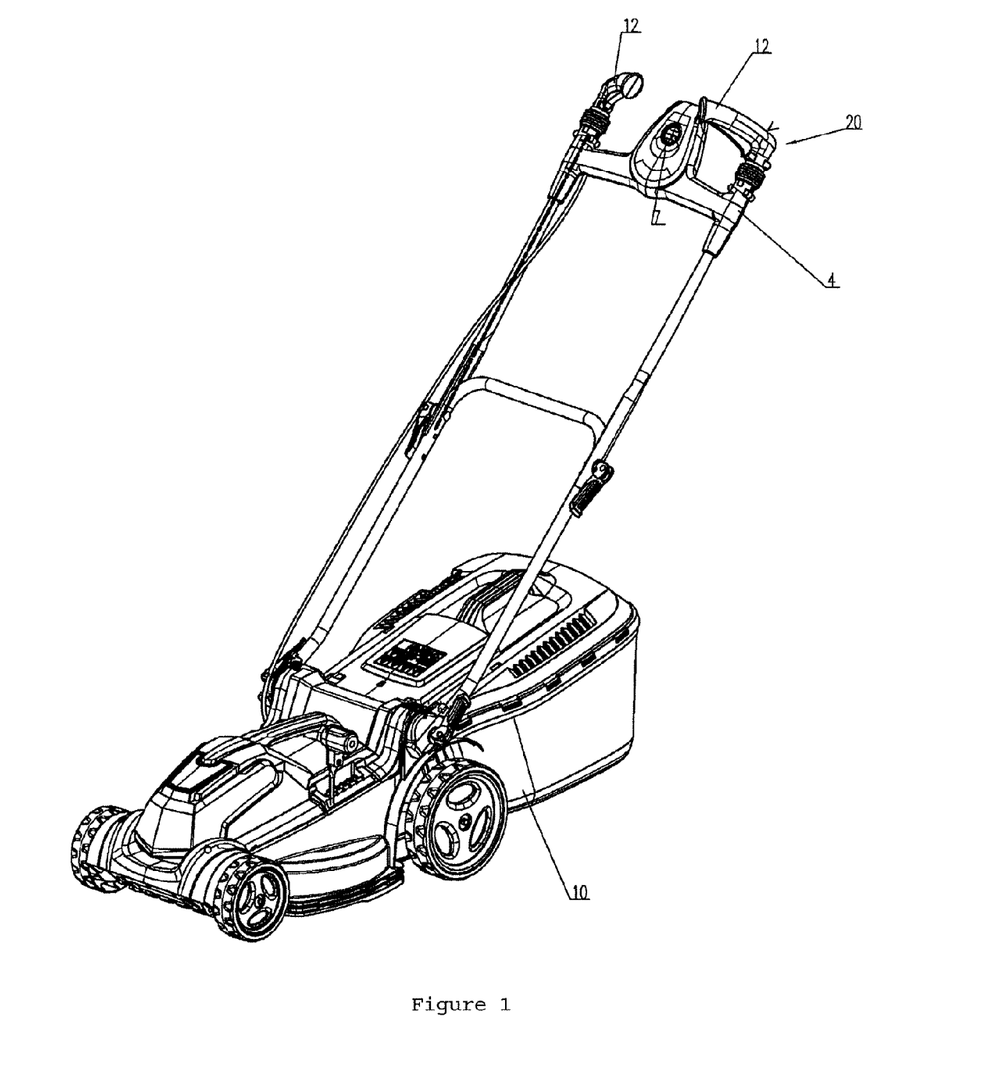
FIG. 1 is a three-dimensional schematic diagram of a garden tool of a first preferred embodiment of the present invention.
Figure 2:
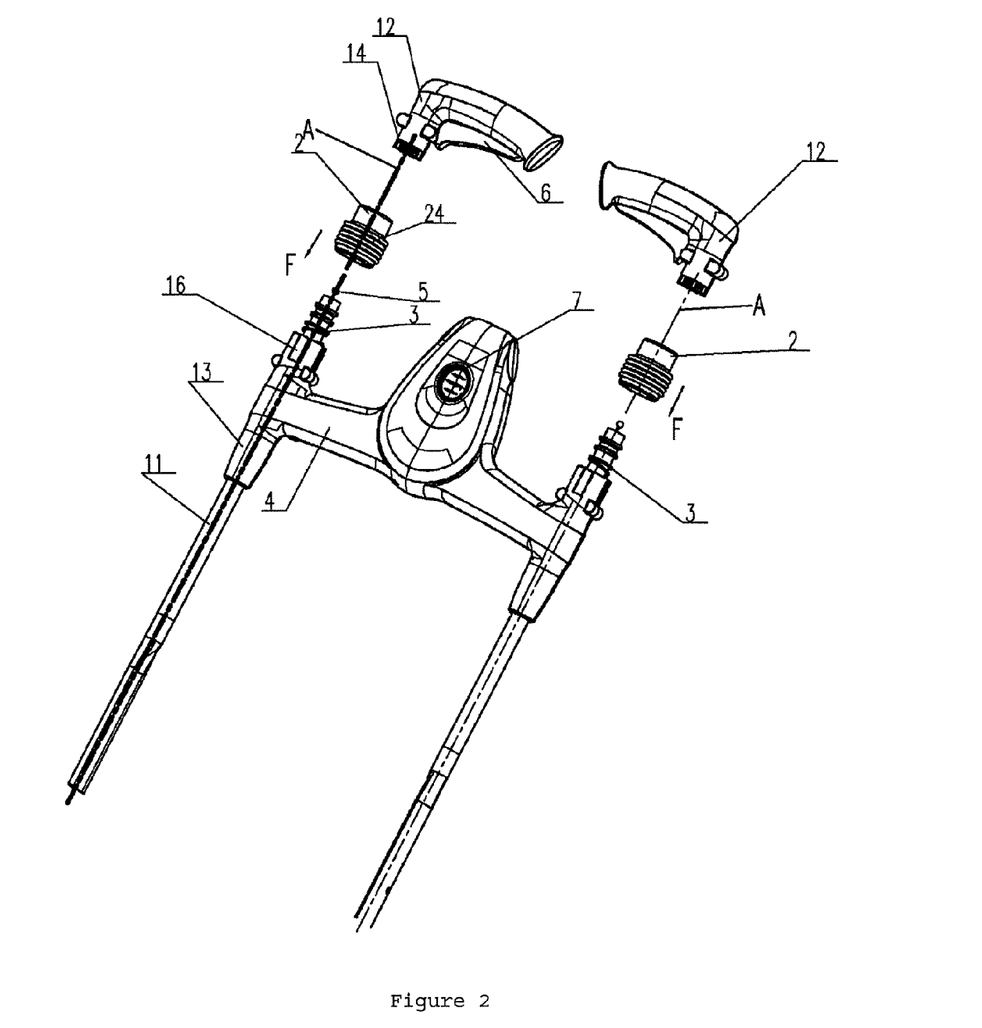
FIG. 2 is a three-dimensional exploded view of an operating control mechanism from FIG. 1.
Figure 3:
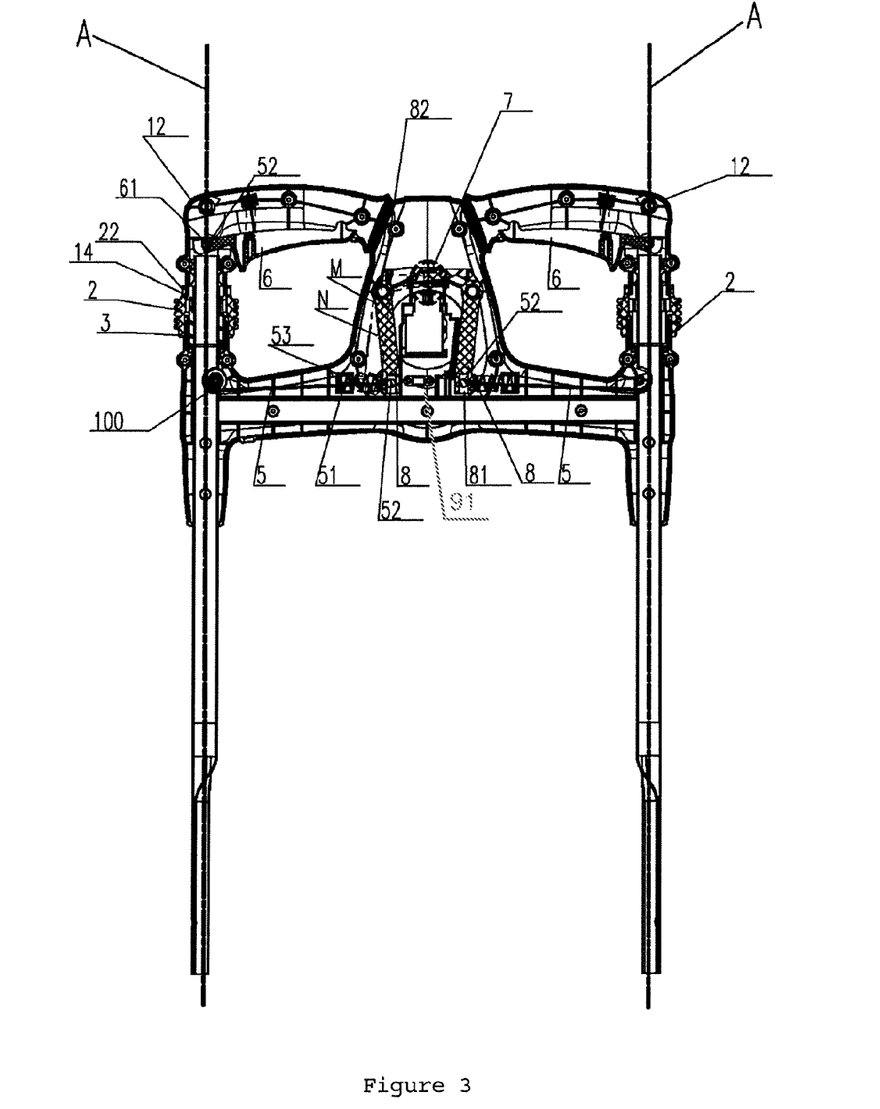
FIG. 3 is a sectional view of FIG. 2 in an assembled state.

Referring to FIGS. 1 to 3, a garden tool according to a preferred embodiment of the present invention is an electrical lawn mower, comprising a machine body part 10 for performing cutting work and an operating control mechanism 20 mounted on the machine body part 10.

The operating control mechanism 20 comprises a control button 7 and a pair of handles 12 which are arranged on two sides of the control button 7. The handles 12 of the pair are each provided with a trigger 6, and the machine can be activated by pulling a single trigger 6; the pair of handles 12 can also form a closed area with the machine body, thereby facilitating the operation. Pull ropes 5 and driving levers 8 are arranged inside a housing 4 of the operating control mechanism 20, and when the machine is to be activated, the control button 7 is pressed down and either of the triggers 6 is closed, so that the driving levers 8 are pulled by the pull ropes 5, and thus a switch is triggered.

The operating control mechanism 20 further comprises stop components 2 and elastic elements 3, which are movable relative to the handles 12. The stop components 2 are movable downwards relative to the handles 12, and each is a hollow cylinder and provided with an operable part 24 on an outer surface thereof. An inner surface of the stop component 2 is provided with a first toothed part 22, an outer surface of each of the handles 12 is provided with a second toothed part 14, and the first toothed part 22 is engagable with the second toothed part 14 so as to limit and secure the stop component 2. The housing 4 is provided with positioning columns 16, and the stop component 2 is arranged between the positioning column 16 and the handle 12. Said elastic element 3 is sheathed on the positioning column 16 and is arranged inside the stop component 2.

Figure 4:
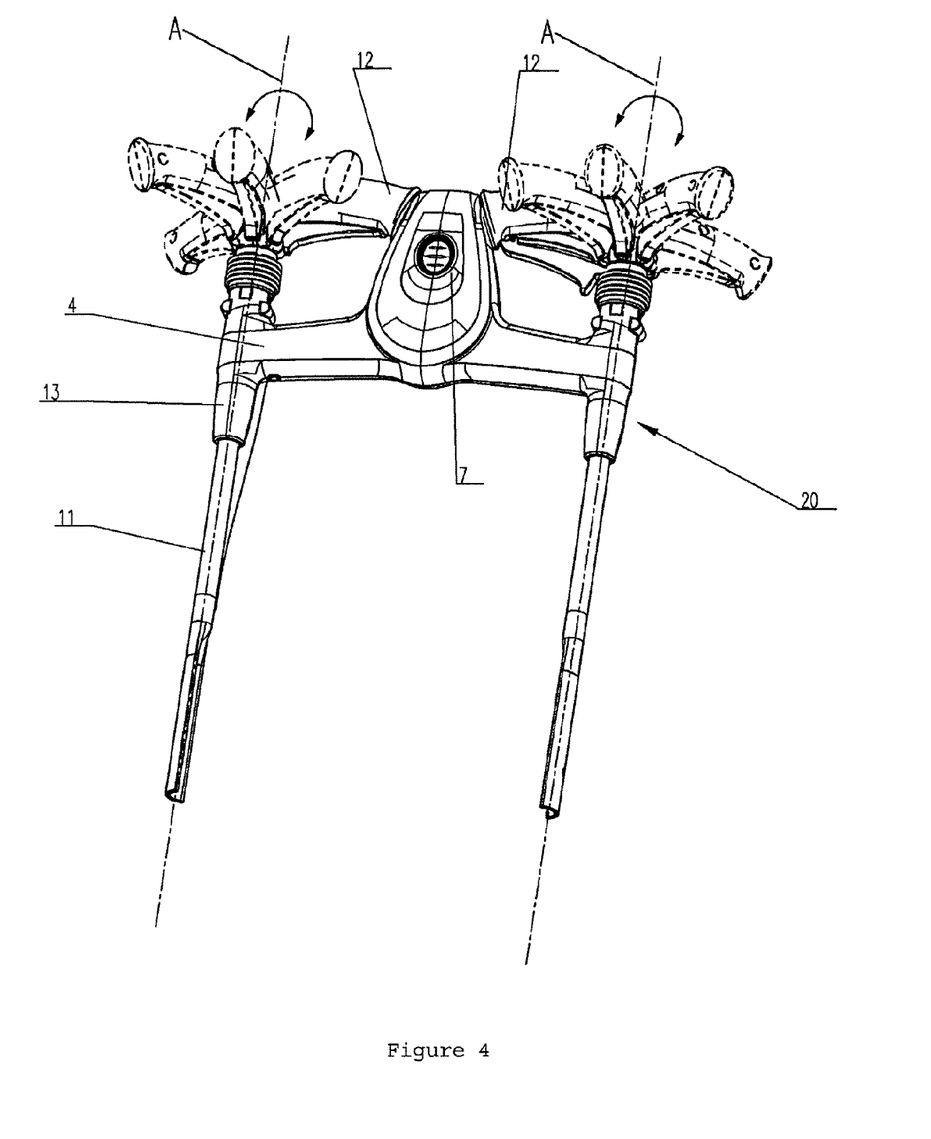
FIG. 4 is a three-dimensional schematic diagram of handles of the operating control mechanism, which handles are in different rotated positions.

In this way, when a user needs to rotate a handle 12, he presses downwards the operable part 22 of the stop component 2, as shown by the arrow F, so that the engagement between the first toothed part 22 of the stop component 2 and the second toothed part 14 of the handle 12 is released and thus the handle 12 can rotate around the longitudinal rotational axis A thereof in a range of 360 degrees, as shown in FIG. 4. When the handle 12 is rotated to an appropriate position, the operable part 22 of the stop component 2 is released, so that the stop component 2 bounces upwards under a restoring force of the elastic element 3 to be engaged with the handle 12, thus limiting and securing the handle 12 again, in which case, the handle 12 can reach a position which is suitable for operation by the user.

In addition, the operating control mechanism 20 further comprises two steel tubes 11 which are connected to two sides of the machine body part 10. Each steel tube 11 is provided with a rotary mechanism 13 which can rotate around an axis thereof (not shown in the figures). The steel tube 11 runs through the positioning column 16 and the stop component 2, so that the rigidness and strength of the connection therebetween are enhanced.

Embodiment II

Figure 5:
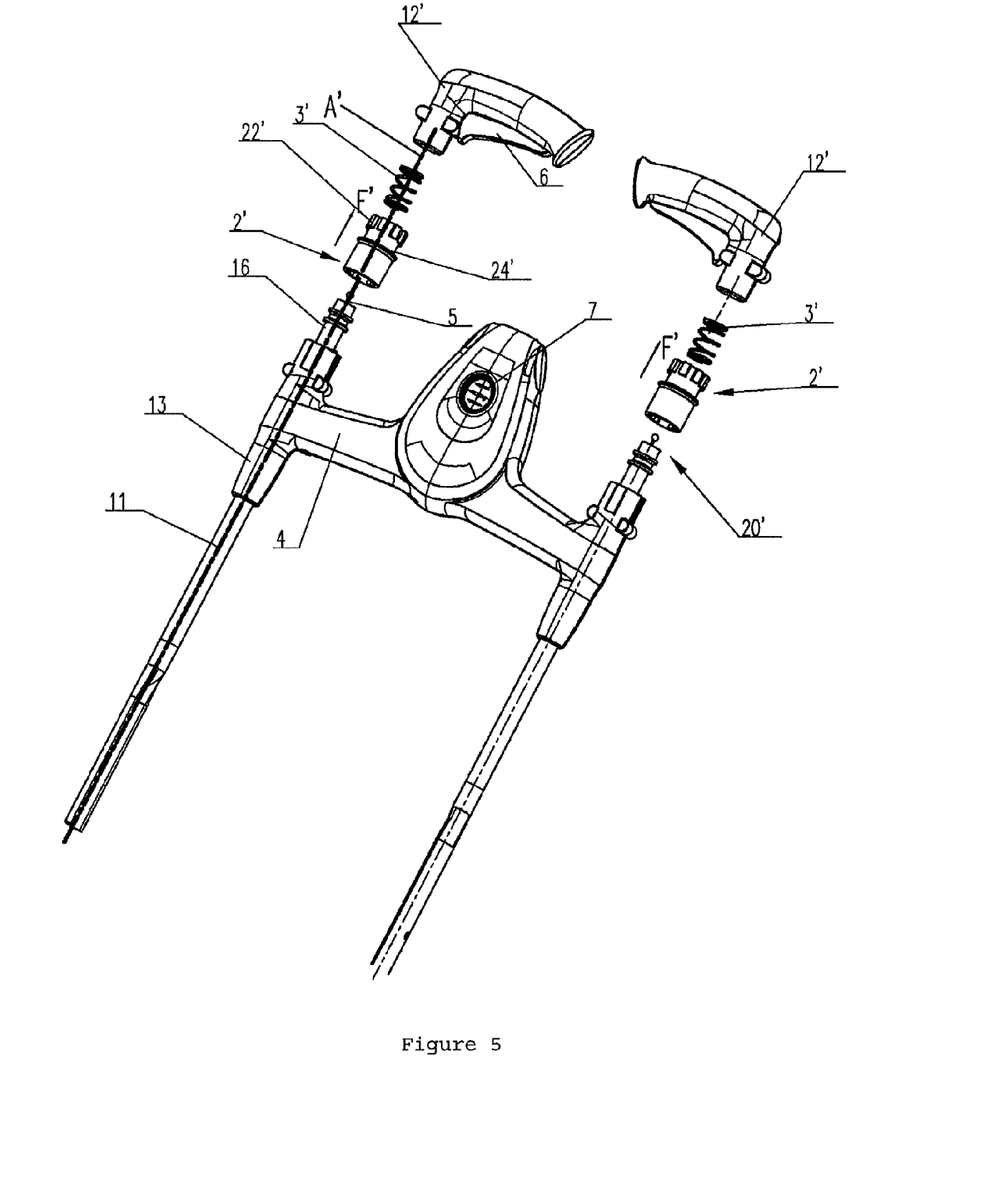
FIG. 5 is a three-dimensional exploded view of an operating control mechanism for a garden tool of a second preferred embodiment of the present invention.
Figure 6:
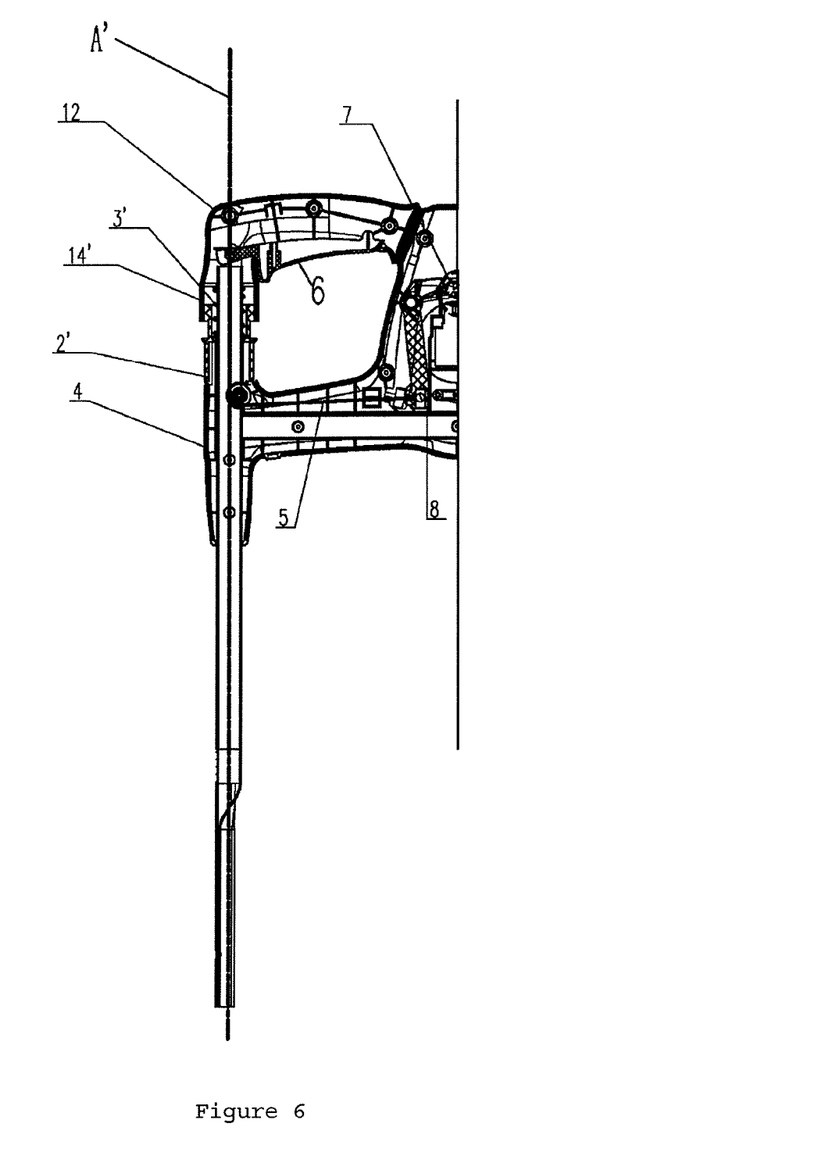
FIG. 6 is a partial sectional view of FIG. 5 in an assembled state.

Further referring to FIGS. 5 and 6, in embodiment II, the operating control mechanism 20' has a structure substantially similar to that of the operating control mechanism 20 in embodiment I, and thus identical structures are denoted with identical reference numbers and are not stated in detail, only different structures being explained and illustrated.

A stop component 2' in the present embodiment is provided with a first toothed part 22' and an operable part 24' on the outer surface thereof. An inner surface of each handle 12' is provided with a second toothed part 14' which is engagable with the first toothed part 22', and an elastic element 3' is sheathed on a positioning column 16 and arranged between the stop component 2' and the handle 12'. Pulling the operable part 24' upwards moves the stop component 2' upwards relative to the handle 12', as shown by the arrow F', so that the engagement between the first toothed part 22' and the second toothed part 14' is released and thus the handle 12' can rotate around the rotational axis A' thereof in a range of 360 degrees.

Embodiment III

Further referring to FIGS. 7 and 8, again in embodiment III, the operating control mechanism 20" has a structure substantially similar to those of the operating control mechanisms 20, 20' in embodiments I and II, and thus identical structures are denoted with identical reference numbers and are not stated in detail, only different structures being explained and illustrated.

Figure 7:
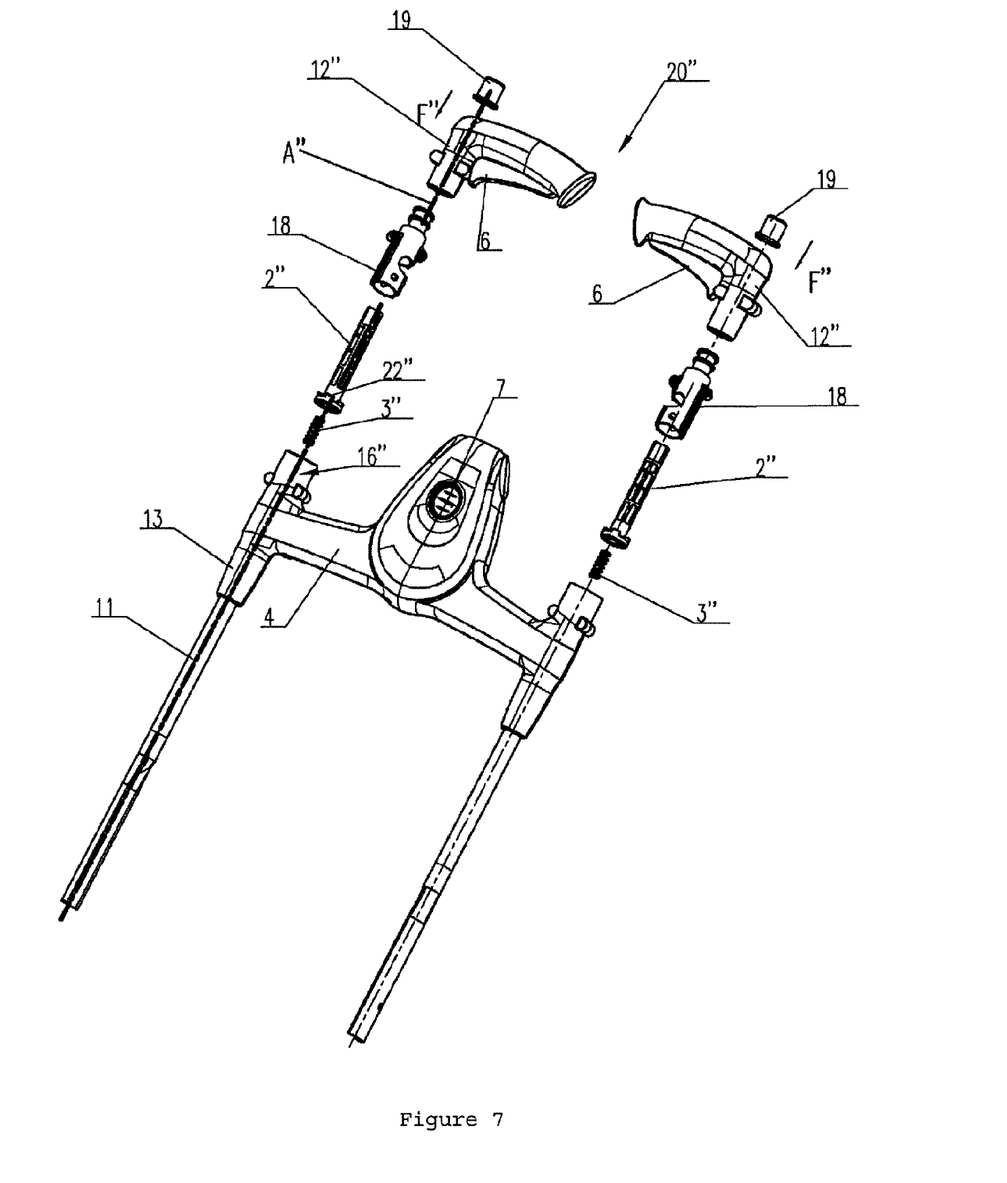
FIG. 7 is a three-dimensional exploded view of an operating control mechanism for a garden tool of a third preferred embodiment of the present invention.
Figure 8:
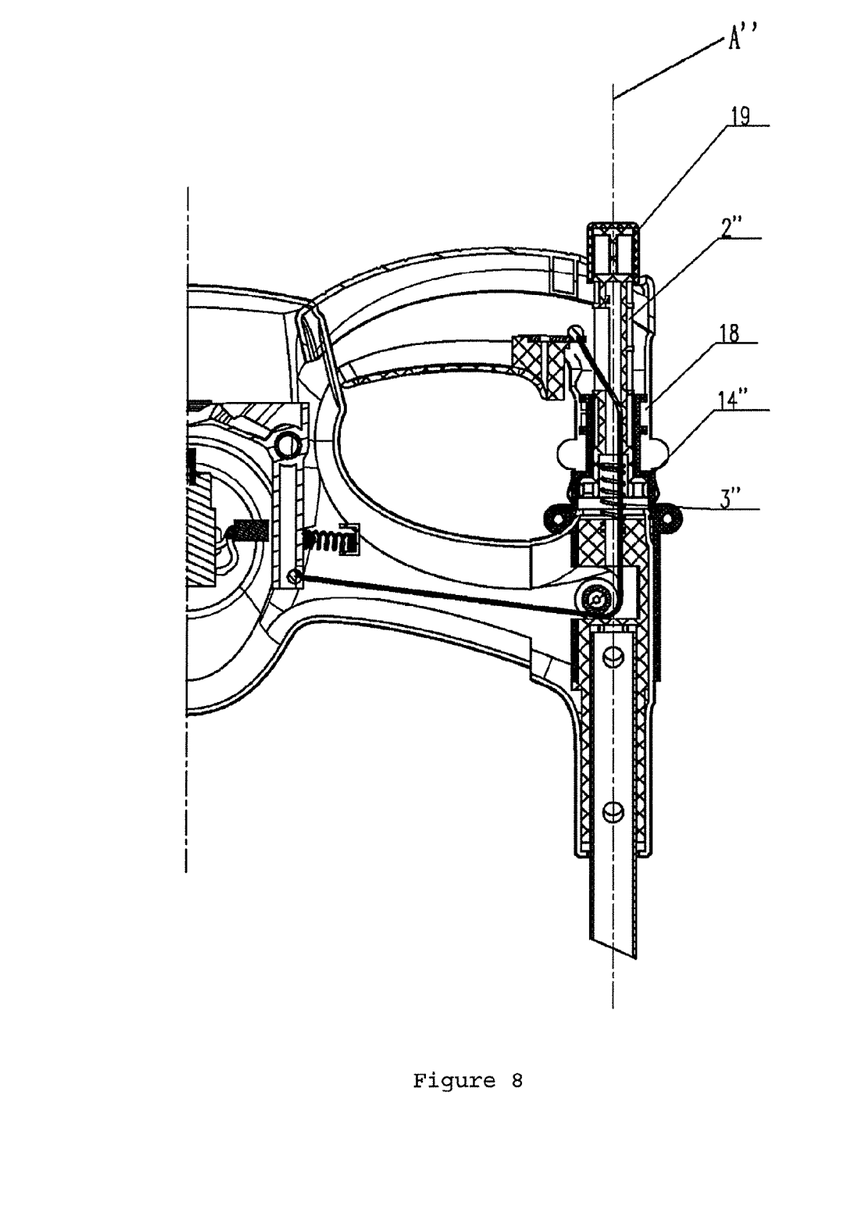
FIG. 8 is a partial sectional view of FIG. 7 in an assembled state.

The operating control mechanism 20" in the present embodiment comprises handles 12", stop components 2", casing tubes 18 which are sheathed on the stop components 2", elastic elements 3" and buttons 19. A lower end part of each of the stop components 2" is provided with a first toothed part 22', each of the casing tubes 18 is provided with a second toothed part 14", and the first toothed part 22" is engagable with the second toothed part 14". Each of the casing tubes 18 is arranged between the stop component 2" and the handle 12". Each of the elastic elements 3" is arranged between the stop component 2" and the positioning column 16". The buttons 19 are mounted on the handles 12 and are engagable with the stop components 2". In this way, when a handle 12" needs to be rotated, a button 12" is pressed downwards as shown by the arrow F" such that the engagement between the stop component 2" and the casing tube 18 is released and therefore the handle 12" can rotate around the rotational axis A" thereof in a range of 360 degrees.

Embodiment IV

Figure 9:
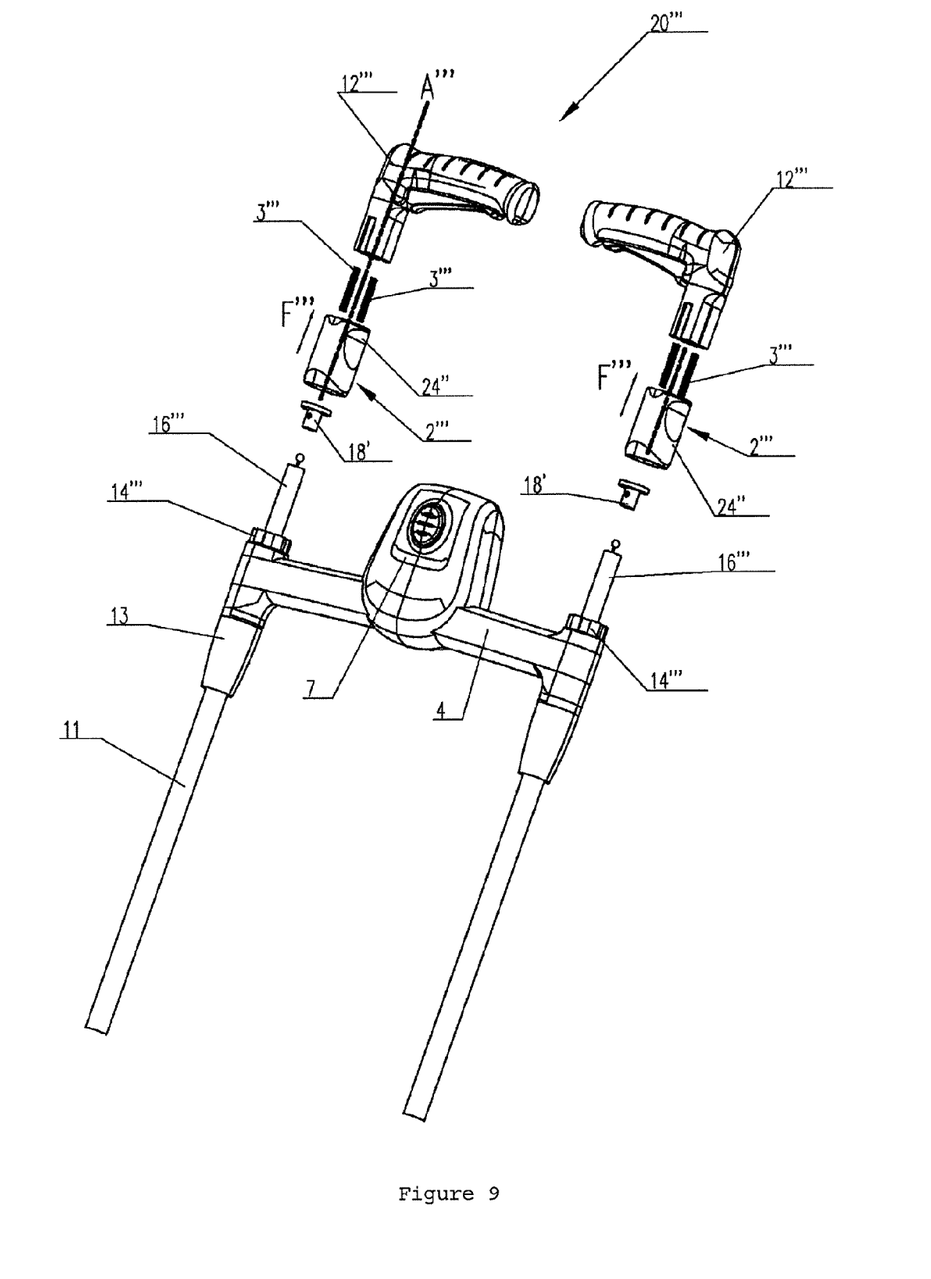
FIG. 9 is a three-dimensional exploded view of an operating control mechanism for a garden tool of a fourth preferred embodiment of the present invention.
Figure 10:
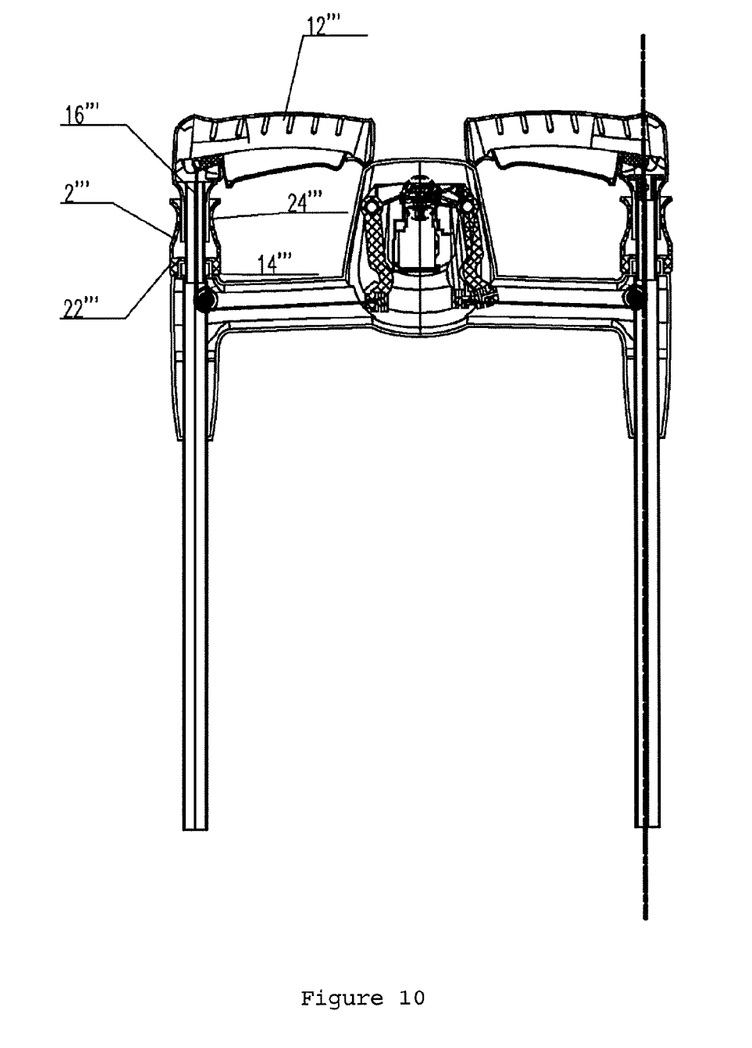
FIG. 10 is a sectional view of FIG. 9 in an assembled state.
Figure 11:
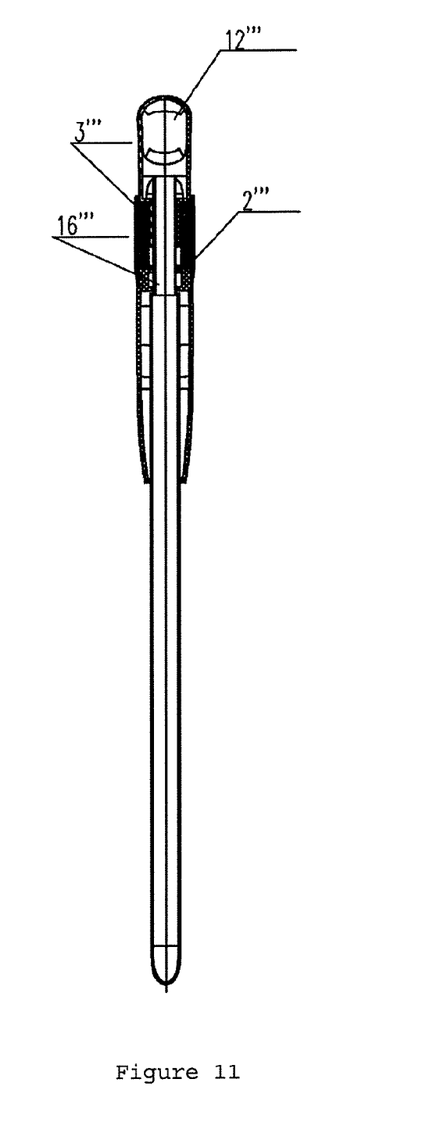
FIG. 11 is another sectional view of FIG. 9 in an assembled state.

Further referring to FIGS. 9 to 11, the operating control mechanism 20'" of the present embodiment has a structure substantially similar to those of the operating control mechanisms 20, 20', 20" in embodiments I, II and III, and thus identical structures are denoted with identical reference numbers and are not stated in detail, only different structures being explained and illustrated.

The operating control mechanism 20'" in the present embodiment comprises handles 12'", stop components 2'", a pair of elastic elements 3'" and casing tubes 18'. An outer surface of each of the stop components 2'" is also provided with an operable part 24"" which is used for pulling the stop component 2'" upwards in the F'" direction, and the stop component is arranged between a handle 12'" and a positioning column 16'". An inner surface of each of the stop components 2'" is provided with a first toothed part 22'", and an outer surface of the bottom end of each positioning column 16'" is provided with a second toothed part 14'" which is engagable with the first toothed part 22'". The casing tubes 18' are sheathed on the positioning columns 16'" and are arranged inside the handles 12'". The pair of elastic elements 3'" is arranged between the stop components 2'" and the handles 12'". When a handle 12'" needs to be rotated, pulling the operable part 24"" upwards moves the stop component 2''' upwards relative to the handle 12''', as shown by the arrow F''', so that the engagement between the first toothed part 22''' and the second toothed part 14''' is released and thus the handle 12''' can rotate around the rotational axis A''' thereof in a range of 360 degrees.

The switch control mechanism for a garden tool in the embodiments is further described below. Referring to FIGS. 3 and 12-14, the switch control mechanism comprises a switch 91, driving levers 8, pull ropes 5 and handles 12, wherein the switch 91 is arranged in the housing 4, and the switch 91 can control the opening and closing of an electrical circuit of the garden tool. The driving levers 8 are arranged on two sides of the switch 91, the driving levers 8 can rotate around a rotary shaft 82, and one end part of each of the driving levers 81 is provided with a first clamping groove 81. Each of the handles 12 is provided with a movable trigger 6, the trigger 6 is provided with a second clamping groove 61, and the trigger 6 is connected to the driving lever 8 by means of the pull rope 5; of course, the pull rope 5 can be made of any material as long as it can withstand a certain pulling force; two ends of the pull rope 5 are respectively provided with a cooperative part 52, the cooperative parts 52 are respectively arranged in the first clamping groove 81 and the second clamping groove 61, a contact surface between the cooperative part 52 and a connection part of the trigger 6 is a spherical surface, i.e., the contact surface between the cooperative part 52 and the inside of the second clamping groove 61 is a spherical surface, and the center of the spherical surface is on the rotational axis A, A', A'', A''' of the handle 12; the pull rope 5 at least partially overlaps the rotational axis A, A', A'', A''', and the cooperative parts 52 on two ends of the pull rope in the present embodiment are both in a spherical shape and are fixedly connected to the pull rope. As stated above, the cooperative part which cooperates with the first clamping groove 61 can be of another structure, as long as the contact surface between the cooperative part 52 and the trigger 6 is a spherical surface. Each of the pull ropes 5 is further sheathed with a spring 51, two ends of the spring bear against the driving lever 8 and a base 53, respectively, and the spring 51 provides a restoring force for the driving lever 8. The switch control mechanism is further provided with rollers 100 which can fix the trajectory of the pull ropes 5 such that the pull ropes have a constant travel, while at the same time reducing the friction force between the pull ropes and the enclosure of the machine. The control principle of the switch control mechanism is as follows: a trigger 6 on a handle 12 is pulled by a user such that the movement of the trigger 6 drives, by means of the pull rope 5, the driving lever 8 to rotate, and the driving lever 8 is moved from position M to position N, thus triggering the switch 91, so that the electrical circuit of the garden tool is closed; since the cooperative part 52 of the pull rope 5 is in spherical-surface contact with the trigger 6, there is a relative rotation between the cooperative part 52 and the trigger 6 when the handle 12 is rotated, thereby preventing the pull rope 5 from rotating along with the handle 12. Therefore, regardless of the position into which the handle 12 is rotated, the connection between the driving lever 8 and the trigger 6 is not influenced, and the machine can be controlled by the user. When the trigger 6 is released by the user, the spring 51 provides a restoring force for the driving lever 8, such that the driving lever 8 is returned from position N to position M, and the switch 91 opens the electrical circuit.

Figure 12:
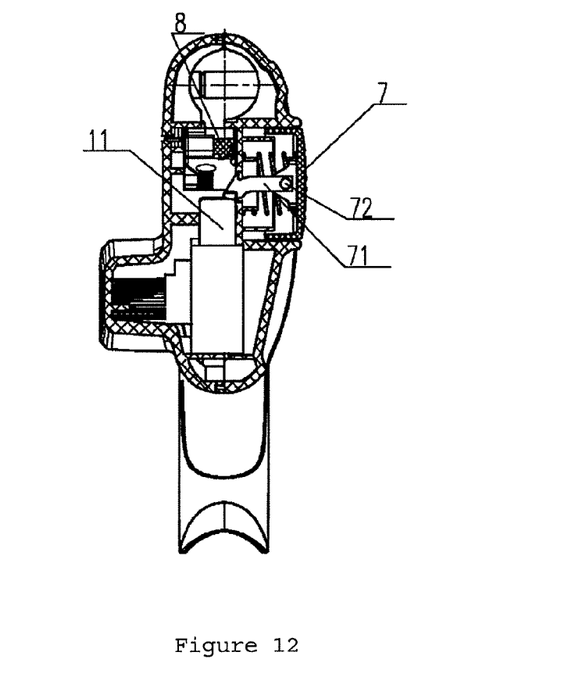
FIG. 12 is a sectional view of a switch control mechanism of an embodiment of the present invention.
Figure 13:
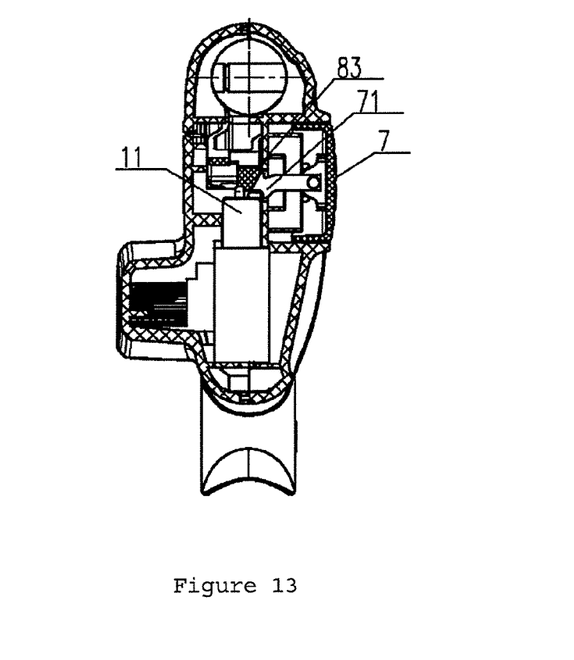
FIG. 13 is a sectional view of the switch control mechanism of the embodiment of the present invention when a trigger is pulled.
Figure 14:
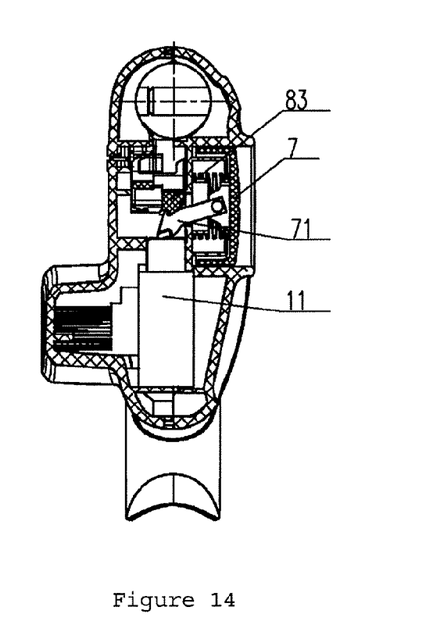
FIG. 14 is a sectional view of the switch control mechanism of the embodiment of the present invention in another state.

Further, in order to make the garden tool more safe to operate, the switch control mechanism can further comprise a control button 7 which is arranged on the housing 4, with a tongue part 71 being arranged inside the control button 7 and rotatable around a button shaft 72. FIG. 12 is a schematic diagram, with the trigger 6 and the control button 7 being not pressed, in which case, a trigger end 83 of each driving lever 8 is at a distance from the switch 91, and only the trigger 6 is operated (as shown in FIG. 13), and at this point, the driving lever 8 is driven into rotation by the trigger 6, while the trigger end 83 is still at a distance from the switch 91 and cannot trigger the switch 91; such a design is to avoid damage due to a misoperation by a user. Therefore, the control button 7 should be firstly pressed by the user such that the tongue part 71 protrudes forwards, and at this point, the trigger 6 is then operated, the trigger 6 drives the driving lever 8, the trigger end 83 of the driving lever 8 bears against the tongue part 71, and the tongue part 71 rotates to trigger the switch 91, so that the electrical circuit of the garden tool is closed; this design provides higher safety for the user when operating the machine.

It should be noted that the preferred embodiments are only provided for illustrating the technical concept and characteristics of the present invention, for the purpose of enabling those skilled in the art to understand the content of the present invention and to implement the present invention, but not for limiting the scope of protection of the present invention. Any equivalent variation or modification for the spirit of the present invention shall be incorporated in the protective scope of the present invention.

We claim:

1. A switch control mechanism for a garden tool, comprising handles, a switch and driving levers, the handles each being provided with a trigger, wherein said handles are rotatable around rotational axes thereof, the triggers are connected to the driving levers via pull ropes, and contact surfaces between said pull ropes and the triggers are spherical surfaces, and said pull ropes are rotatable relative to said triggers when the handle is rotated.

2. The switch control mechanism for a garden tool as claimed in claim 1, wherein said triggers are each provided with a second clamping groove, said pull ropes are each provided with a cooperative part, and said contact surface is a contact portion between said cooperative part and the second clamping groove.

3. The switch control mechanism for a garden tool as claimed in claim 2, wherein said cooperative part is spherical.

4. The switch control mechanism for a garden tool as claimed in claim 2, wherein said triggers are each provided with a first clamping groove, two ends of each of said pull ropes are respectively provided with said cooperative part, and said cooperative parts are respectively arranged in the first clamping groove and the second clamping groove.

5. The switch control mechanism for a garden tool as claimed in claim 1, wherein the driving levers are rotatable around rotational axes thereof, and said pull ropes are each sheathed with a spring.

6. The switch control mechanism for a garden tool as claimed in claim 1, wherein said handles and the driving levers are paired.

7. The switch control mechanism for a garden tool as claimed in claim 1, further comprising rollers, said pull ropes passing over the rollers to be connected to the driving levers and the triggers.

8. The switch control mechanism for a garden tool as claimed in claim 1, wherein the center of said spherical surface is located on the rotational axis of each of said handles.

9. The switch control mechanism for a garden tool as claimed in claim 1, wherein said pull ropes each at least partially overlap said rotational axes.

10. The switch control mechanism for a garden tool as claimed in claim 1, further comprising a control button, said control button being arranged on a housing of the switch control mechanism housing for a garden tool.

11. The switch control mechanism for a garden tool as claimed in claim 10, wherein said control button is provided with a tongue part, and said tongue part protrudes above the switch when the control button is pressed.

12. The switch control mechanism for a garden tool as claimed in claim 11, wherein said driving levers are each provided with a trigger end which is arranged above the tongue part.

* * * * *